United States Patent
Iwao et al.

(10) Patent No.: US 7,534,192 B2
(45) Date of Patent: May 19, 2009

(54) VEHICLE POWER TRANSMISSION DEVICE USING A FLUID COUPLING

(75) Inventors: Nobuyuki Iwao, Kanagawa (JP);
Yasushi Yamamoto, Kanagawa (JP);
Atsushi Yamazaki, Kanagawa (JP);
Takahiro Kuwata, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 424 days.

(21) Appl. No.: 10/592,357

(22) PCT Filed: Mar. 15, 2005

(86) PCT No.: PCT/JP2005/005078

§ 371 (c)(1),
(2), (4) Date: Sep. 11, 2006

(87) PCT Pub. No.: WO2005/090835

PCT Pub. Date: Sep. 29, 2005

(65) Prior Publication Data

US 2007/0207893 A1    Sep. 6, 2007

(30) Foreign Application Priority Data

Mar. 18, 2004    (JP)    ............................. 2004-078522

(51) Int. Cl.
*F02D 23/00*    (2006.01)
(52) U.S. Cl. ..................................................... 477/32
(58) Field of Classification Search ................... 477/32, 477/33
See application file for complete search history.

(56) References Cited

U.S. PATENT DOCUMENTS

| | | | |
|---|---|---|---|
| 4,510,747 A | 4/1985 | Yoshida | |
| 4,669,441 A * | 6/1987 | Okimoto | ................... 123/559.3 |
| 4,944,199 A | 7/1990 | Okino et al. | |
| 6,607,467 B2 * | 8/2003 | Tabata | .......................... 477/33 |

(Continued)

FOREIGN PATENT DOCUMENTS

JP    62-228750    10/1987

(Continued)

OTHER PUBLICATIONS

European Search Report dated Oct. 16, 2007.

(Continued)

*Primary Examiner*—Dirk Wright
(74) *Attorney, Agent, or Firm*—McGinn IP Law Group, PLLC (57) ABSTRACT

A vehicle power transmission device in which an engine 61 equipped with a turbo charger 62 and a fluid coupling 2 with a lockup clutch are combined together, wherein a timing for connecting the lockup clutch 25 is normalized to accomplish a smooth connecting during the low-speed traveling after the start. A lockup clutch control device is equipped with means for detecting the operating condition of the turbo charger 62, and the lockup clutch 25 starts to be connected at a moment before the turbo charger 62 reaches a high output state. The lockup clutch 25 is connected within a short period of time without producing a shock due to connection and the vehicle, thereafter, accelerates smoothly. A rate of change in the revolution of the engine 61 or the pressure in the intake pipe 63 is detected to detect the operating condition of the turbo charger 62.

5 Claims, 9 Drawing Sheets

U.S. PATENT DOCUMENTS

| | | |
|---|---|---|
| 6,790,158 B2 * | 9/2004 | Tabata .................. 477/33 |
| 6,817,965 B2 * | 11/2004 | Tabata .................. 477/33 |
| 2002/0006848 A1 | 1/2002 | Tabata |
| 2003/0195084 A1 | 10/2003 | Tabata |

FOREIGN PATENT DOCUMENTS

| | | |
|---|---|---|
| JP | 9-144866 | 6/1997 |
| JP | 2000-27987 | 1/2000 |
| JP | 2001-241546 | 9/2001 |
| JP | 2002-22000 | 1/2002 |

OTHER PUBLICATIONS

Microfilm of the specification and drawings annexed to the request of the Japanese Utility Model Application No. 902128/19889 (Laid-open No. 29762/1991).

Microfilm of the specification and drawings annexed to the request of the Japanese Utility Model Application No. 109916/1986 (Laid-open No. 15358/1988).

* cited by examiner

VEHICLE POWER TRANSMISSION DEVICE USING A FLUID COUPLING

TECHNICAL FIELD

The present invention relates to a vehicle power transmission device which includes a fluid coupling between an engine and a transmission, making it possible to accomplish a smooth start by utilizing the slipping between the pump and the turbine in the fluid coupling at the time of starting the vehicle without requiring cumbersome clutch operation by the driver of a vehicle.

BACKGROUND ART

A variety kinds of vehicle power transmission devices for easy driving have been developed in an attempt to facilitate the driving of vehicles and to reduce fatigue to the drivers by automatically operating the clutch or the transmission that transmits the power of the engine to the wheels. A representative example may be a so-called AT vehicle by using a power transmission device comprising a torque converter which is a fluid transmission device and a planetary gear mechanism. One of them may be a power transmission device for easy drive which uses a transmission of the type of a parallel axis gear mechanism similar to that of a so-called manual vehicle combined with an automatic clutch, omitting the clutch operation at the time when the driver attempts to change the speed by using the speed-change lever, and has already been employed in the vehicles placed in the market. There has also been provided a power transmission device which automatically changes the gear depending upon the traveling conditions of the vehicle by using an electronic controller and an actuator for operating the transmission instead of operating the speed-change lever by the driver.

In recent years, there has been developed a power transmission device having a fluid coupling interposed between an engine and a transmission for use in vehicles equipped with a diesel engine. The fluid coupling is a fluid transmission device. Unlike the torque converter, however, the fluid coupling has no stator base and does not have a function for increasing the torque, but is simpler in structure than the torque converter.

With the fluid coupling being interposed, the vehicle can be started by utilizing slipping between the pump and the turbine in the fluid coupling particularly when the vehicle uses a diesel engine that produces a large torque in a region of low engine revolutions. Namely, this easily realizes a smooth start without requiring sophisticated clutch work which is carried out at the time of starting a manual vehicle and, at the same time, absorbs fluctuation in the engine torque during the idling and, further, reduces vibration and noise. An example of the power transmission device having a fluid coupling between the engine and the transmission has been disclosed in JP-A-2001-241546.

Figure 2:
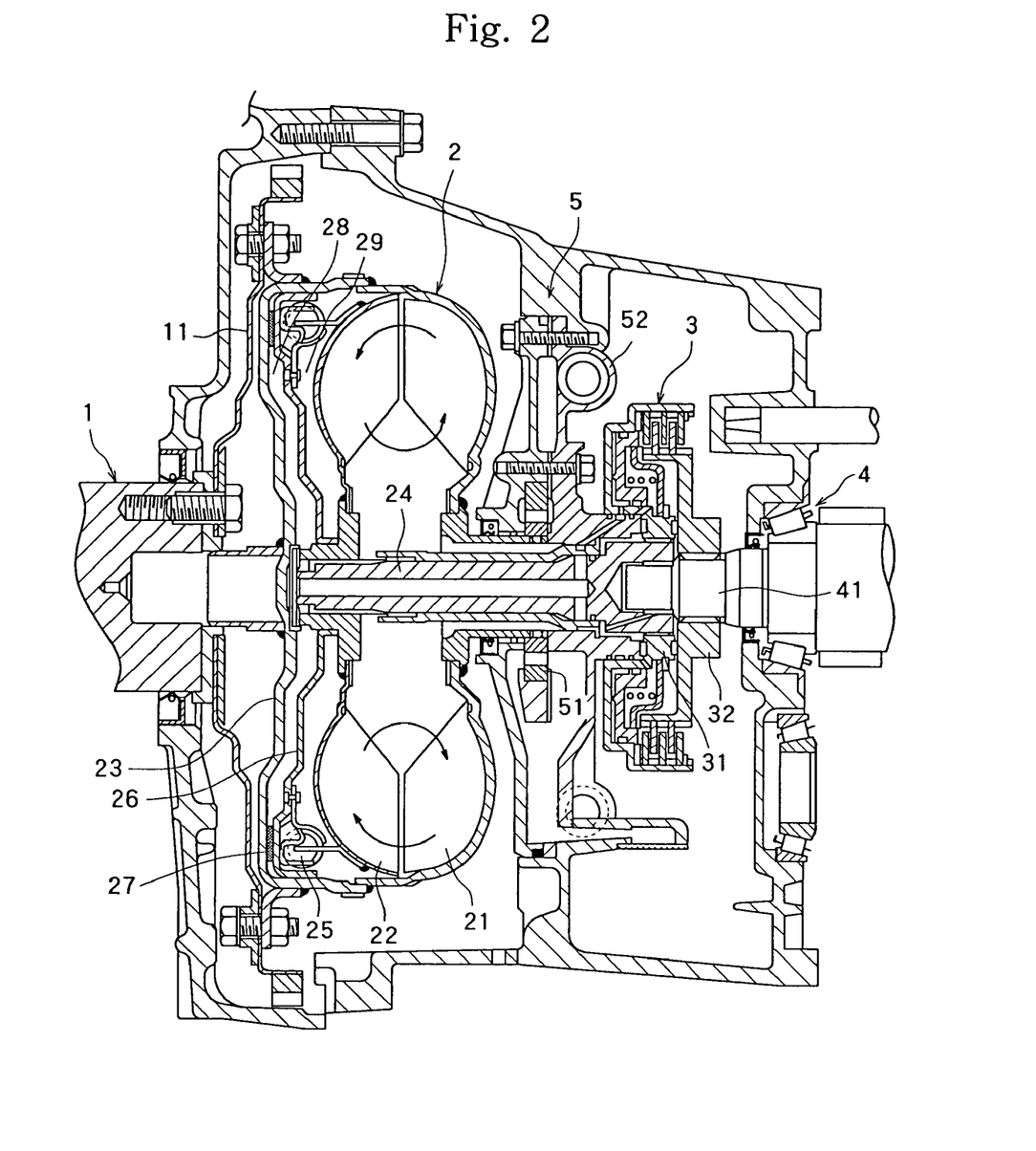
FIG. 2 is a sectional view of a fluid coupling in the vehicle power transmission device.
Figure 3:
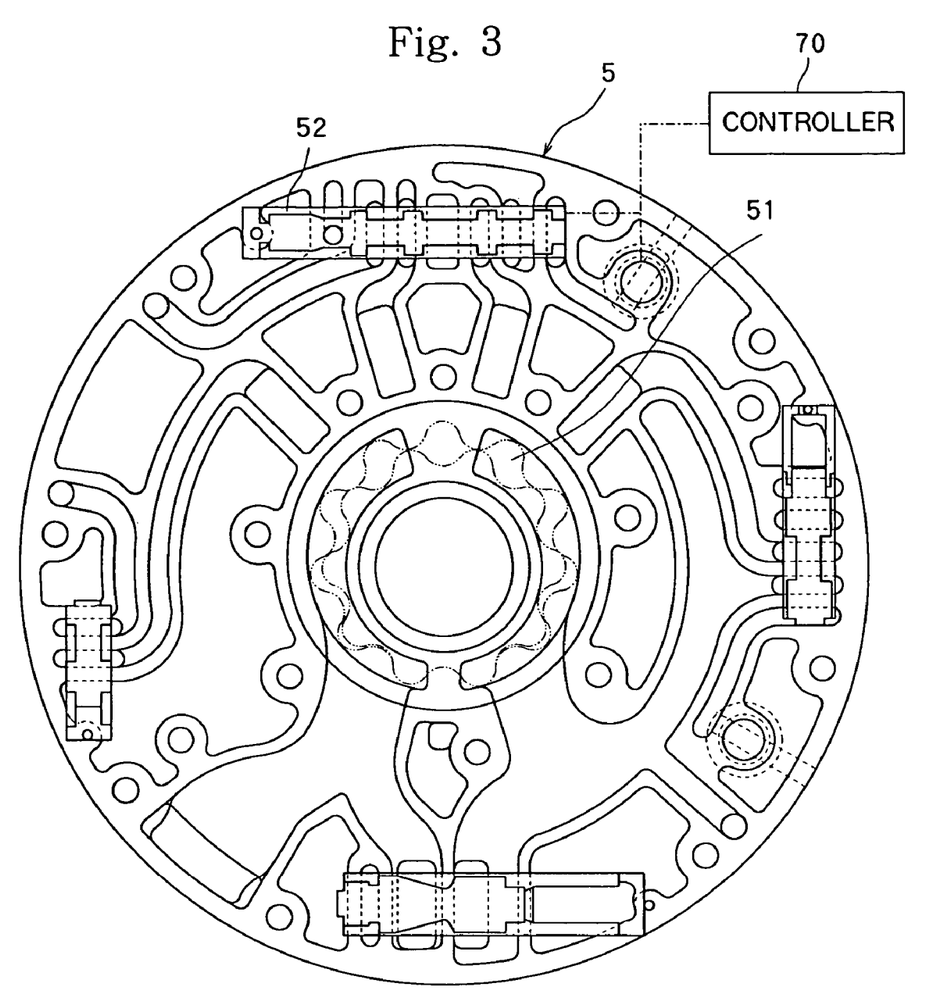
FIG. 3 is a sectional view of a partitioning wall portion of the vehicle power transmission device.

A vehicle power transmission device equipped with the above fluid coupling will now be described with reference to FIGS. 2 and 3. FIG. 2 is a sectional view illustrating a power transmission device between the crankshaft of a diesel engine and the transmission, and in which a fluid coupling 2 is linked at the back of the crankshaft 1 and a transmission 4 having a parallel axis gear mechanism is further linked thereto via a wet multi-plate clutch 3. The fluid coupling 2 includes a pump 21 and a turbine 22 that can be rotated independently of each other, and a casing 23 thereof is filled with an operation oil. The pump 21 in the fluid coupling is integrally coupled to the crankshaft 1 of the diesel engine by using the casing 23 and a drive plate 11. Further, an output shaft 24 of the fluid coupling 2 is coupled to the turbine 22, and a hub portion 31 of an input shaft of a wet multi-plate clutch 3 is coupled to the other end of the output shaft 24 by spline fitting, respectively. The hub portion 32 of the output shaft of the wet multi-plate clutch 3 is coupled to the input shaft 41 of the transmission 4 by spline fitting.

When the diesel engine is started to start the vehicle, the pump 21 of the fluid coupling 2 starts rotating together with the crankshaft 1, and feeds the operation oil into the turbine 22. The flow rate of the operation oil circulating into the turbine 22 from the pump 21 increases with an increase in the revolution of the diesel engine, and an increased torque acts on the turbine 22. The wet multi-plate clutch 3 connected to the fluid coupling 2 is in a connected state due to the oil pressure acting on the friction plates except when changing the speed of the vehicle. Prior to starting the vehicle, the transmission 4 is engaged with the start gear, and the vehicle is at rest since the brake pedal has been depressed. At this moment, the turbine 22, too, is at rest. As the brake pedal is released, however, the turbine 22 starts rotating, and the vehicle starts traveling via the wet multi-plate clutch 3 and the transmission 4. After the start of the vehicle, the revolution of the diesel engine further increases, and the revolution of the turbine 22 increases correspondingly. The slipping of the fluid coupling 2 decreases with the passage of time after the start, the revolution of the turbine 22 gradually increases to approach the revolution of the pump 21 (to approach the revolution of the diesel engine), and the speed ratio thereof approaches 1, i.e., the ratio of the revolution of the turbine to the revolution of the pump in the fluid coupling approaches 1.

By utilizing the fluid coupling 2 as described above, the vehicle can be smoothly started due to the slipping between the pump 21 and the turbine 22. So far as the fluid coupling 2 involves slipping, however, the power transmission efficiency never reaches 100% and the diesel engine consumes the fuel wastefully. When the vehicle starts and performs a normal traveling, therefore, it is desired to halt the function of the fluid coupling 2 and to directly couple the crank shaft 1 to the transmission 4 during the traveling at a low speed of, for example, about 20 Km/h. Therefore, the fluid coupling 2 is provided with a lockup clutch 25 for connecting the pump 21 and the turbine 22 together.

The lockup clutch 25 is placed facing the inner surface of the casing 23 that couples the crankshaft 1 to the pump 21, and is constituted by a clutch disk 26 coupled to the turbine 22 and a friction fading 27 provided on the front surface side thereof. The disconnection and connection of the lockup clutch 25 are controlled by changing over the flow passage through which the operation oil of a high pressure flows in the casing 23 of the fluid clutch 2. For this purpose as shown in FIG. 3 which is a vertical sectional view, a trochoid pump 51 for pressure-feeding the operation oil and a flow passage change-over valve 52 for changing over the flow passage of the operation oil, are mounted on a partitioning wall portion 5 at the rear part of the fluid coupling 2. The fluid passage change-over valve 52 is controlled by a lockup clutch control device 70.

The operation oil pressurized by the trochoid pump 51 flows into a chamber 28 in front of the clutch disk 26 from the passage at the central portion of the output shaft 24, flows into a chamber 29 at the back through a narrow gap at the outer peripheral portion of the clutch disk 26, and flows into an operation chamber defined by the pump 21 and the turbine 22. In this case, the pressure in the chamber 28 in front is higher than that in the chamber 29 at the back. Therefore, the clutch disk 26 is separated away from the casing 23, and the lockup clutch 25 is disconnected. When the flow is reversed by using the flow passage change-over valve 52, the pressure on the rear surface side of the clutch disk 26 becomes high and the friction fading 27 comes into engagement with the inner surface of the casing 23, whereby the lockup clutch 25 is connected, and the pump 21 and the turbine 22 in the fluid coupling 2 are directly coupled together. The fluid passage change-over valve 52 is changed over by the lockup clutch control device 70 that gradually varies the duty ratio of pulses by using a pilot valve to avoid the shock caused by sudden connection of the lockup clutch 25. Detailed constitution of the lockup clutch 25 and a control method thereof have been disclosed in the patent publication described above.

Figure 8:
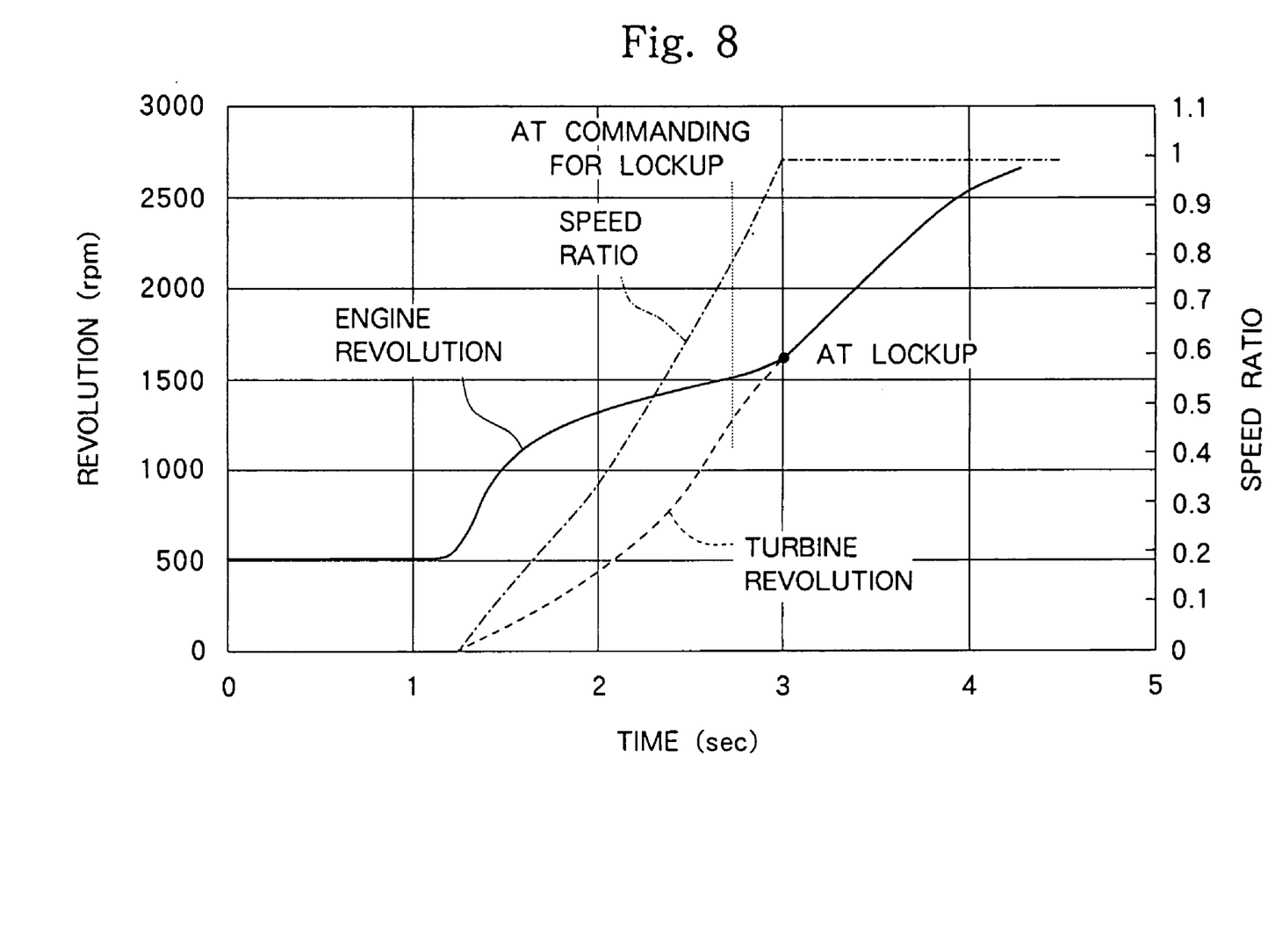
FIG. 8 is a diagram illustrating the operation at the time of start of the vehicle having a natural aspiration engine mounted thereon.

Operation at the time of starting the vehicle power transmission device using the fluid coupling with the lockup clutch will be described below with reference to FIG. 8. FIG. 8 illustrates changes in the revolution of the turbine and in the revolution of the engine (revolution of the pump in the fluid coupling) after the start of the vehicle having mounted thereon a diesel engine of the type of normal aspiration having a large displacement. When the vehicle is at rest, the engine is revolving at an idling speed of about 500 rpm, the wheels are at rest and, hence, the revolution of the turbine is zero. When the driver depresses the accelerator pedal in this state, the engine revolution increases, the torque increases, the turbine starts rotating, and the vehicle starts traveling. Thereafter, the revolution of the turbine increases accompanying an increase in the revolution of the engine, and the speed of the vehicle gradually increases. As the revolution of the turbine in the fluid coupling approaches the revolution of the engine, vehicle speed reaches a predetermined value and the revolution of the engine reaches near 1500 rpm which is a stall revolution that will be described later, the control device produces an instruction for connecting the lockup clutch, and the pump and the turbine are connected together (locked up) according to the instruction; i.e., the two rotates integrally together. At a moment when the instruction is output, the speed ratio which is a ratio of the revolutions of the turbine and the pump is nearly 0.8, and the lockup clutch can be smoothly connected.

Here, the stall revolution of the fluid coupling will be described with reference to FIG. 4. When the fluid coupling having a predetermined size and a torque capacity is combined with a natural aspiration-type engine (NA engine) and when the engine revolution is increased while the turbine in the fluid coupling remains at rest, the load torque that acts on the pump integrally coupled to the engine increases in compliance with a curve of secondary degree depending on an increase in the revolution. As for the output torque of the natural aspiration-type engine, on the other hand, the diesel engine has flat characteristics as represented by a solid line, i.e., the torque remains nearly constant despite of a change in the revolution. Therefore, the revolution is balanced at a point ● where a curve of the rated output torque of the engine meets a curve of the load torque of the pump, and the engine revolution does not increase any more. The engine revolution in this balanced state is called stall revolution. With the power transmission device having the fluid coupling with lockup clutch interposed between the engine and the transmission, in general, the lockup clutch is set to be connected near the stall revolution after the start. When the revolution of the pump increases up to the stall revolution, the speed ratio is, usually, near 0.8. Therefore, the lockup clutch is smoothly connected. Thereafter, the fluid coupling involves no slipping and assures a 100% transmission efficiency.

In the vehicle mounting the natural aspiration engine, i.e., mounting the engine which is not supercharged, the lockup clutch can be connected and the vehicle after it has started can be accelerated flawlessly if the lockup clutch is set to be connected when the vehicle speed has exceeded a predetermined value and the engine revolution has reached near the stall revolution. When a so-called turbo engine equipped with a turbo charger for charging in an attempt to increase the engine output is combined with the fluid coupling, however, it was clarified that the revolution of the engine after it is started rises and once reaches a nearly constant revolution and, thereafter, gradually increases again and creates a phenomenon in which the revolution becomes constant again at a high speed level (see FIG. 5). This phenomenon appears conspicuously in an engine having mounted thereon a turbo charger of a large capacity that increases the engine output over a wide range; i.e., the phenomenon expressing as if there exist a plurality of stall revolutions (hereinafter called "two-step stall").

Figure 4:
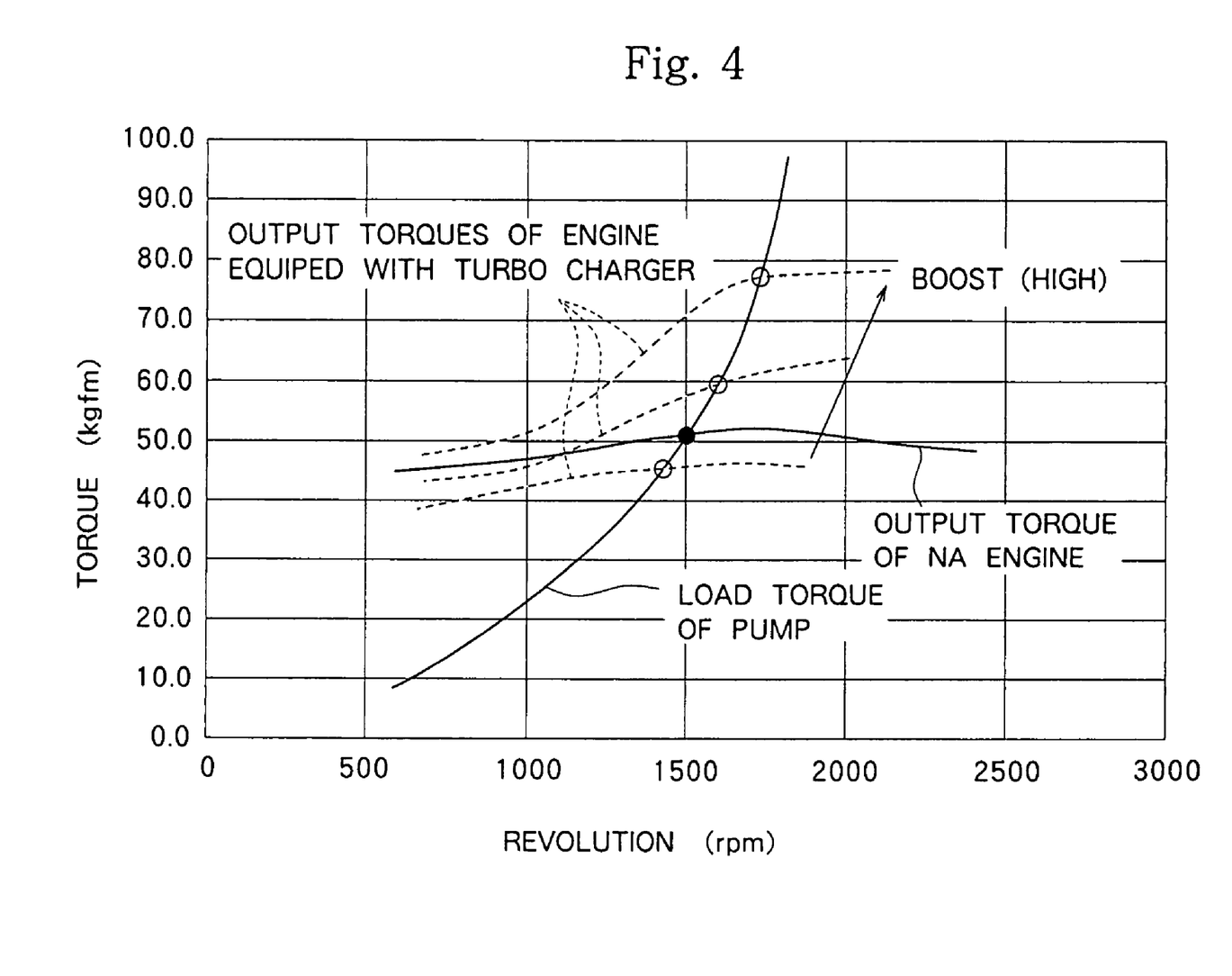
FIG. 4 is a diagram illustrating operation characteristics of when an engine and the fluid coupling are combined together.

It is considered that the two-step stall stems from the output characteristics of the turbo engine represented by broken lines in FIG. 4. That is, in the turbo engine, the turbo charger at the start is not still exhibiting its ability to a sufficient degree, the pressure (boost) of the air supplied into the engine cylinders is low and, therefore, the output torque of the engine is low, exhibiting characteristics as presented by the lowermost broken line in FIG. 4. If the turbo engine is combined with the same fluid coupling as the one used for the natural aspiration engine, the revolution is once balanced at a point (mark ◯) where the lowermost broken line meets a curve of load torque of the pump; i.e., the engine revolution reaches the limit (stall revolution of the first step in FIG. 5). The turbo charger by its own nature is driven by the exhaust gas of the engine. At the start of the engine or during the low-load operation where the amount of the exhaust gas is small, therefore, its revolution is so low that its function is not exhibited to a sufficient degree. The degree of function of the turbo charger is closely related to the operating conditions of the engine and is grasped as a change in the boost in the intake pipe or as a change in the revolution of the engine. Here, the operating state of the turbo charger is referred to as "turbo charger output".

As the revolution increases with an increase in the turbo charger output and as the output torque of the engine increases with an increase in the boost, the balancing point of the load torque of the pump in the fluid coupling shifts toward the direction of a high revolution. Thereafter, as the turbo charger output becomes steady to meet the engine operating condition, the engine revolution becomes constant at the balancing point. When the engine finally enters into the rated operating condition and the boost due to the turbo charger becomes the one of when the engine is in full-load operation, the output characteristics become as represented by the uppermost broken line which is balanced again at a point where it meets the curve of the load torque of the pump, and the engine revolution does not increase any more (stall revolution of second step in FIG. 5). In an engine which recirculates the exhaust gas in an attempt to reduce NOx in the exhaust gas (EGR) not being limited to the engine that has mounted thereon the turbo charger of a large capacity for increasing the engine output over a wide range, for example, the exhaust gas is recirculated during the low-load operation of the engine and the recirculation is halted near the full-load operation. Therefore, a difference in the turbo charger output further increases between when the engine is started and when the engine is in full-load operation.

Figure 9:
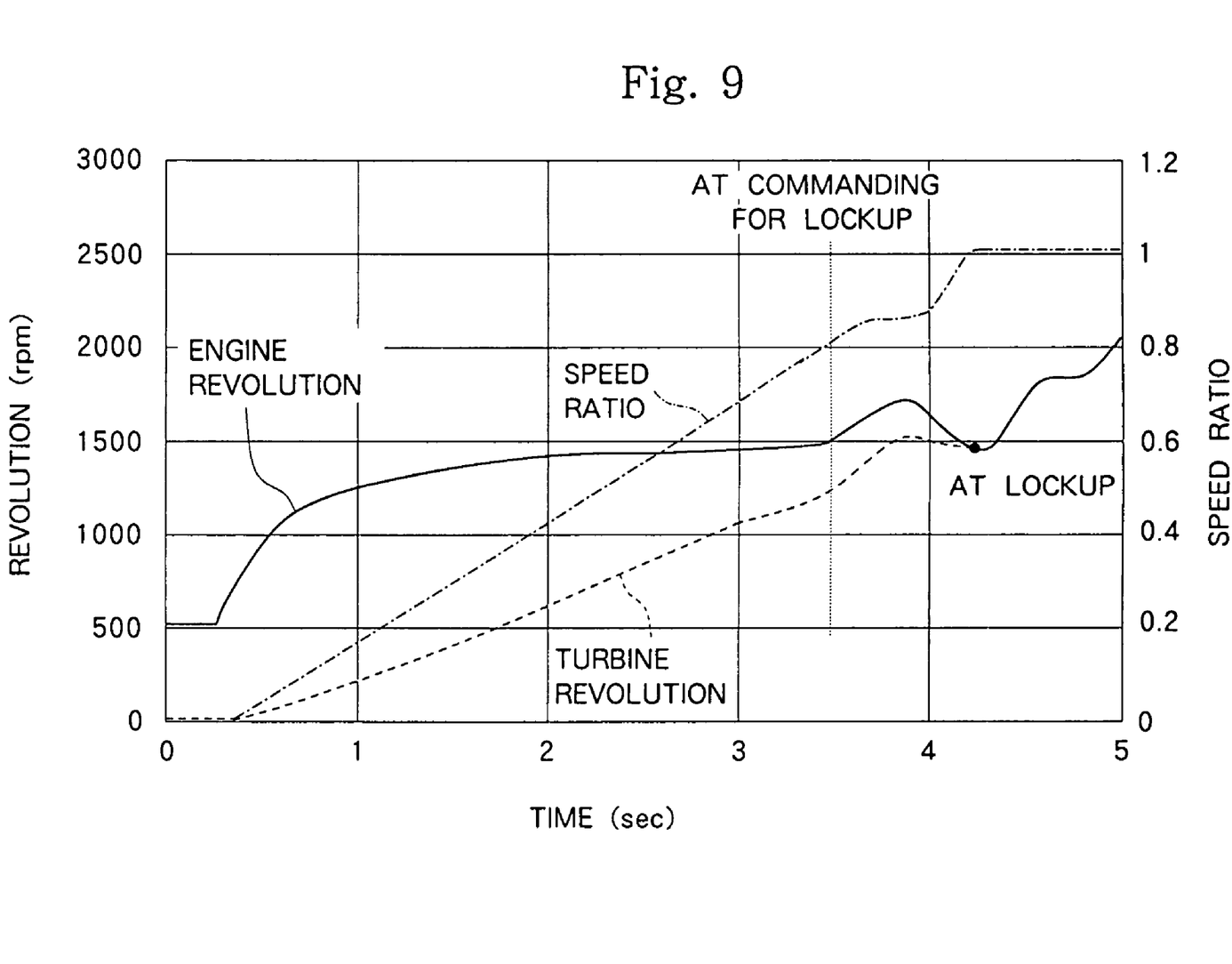
FIG. 9 is a diagram illustrating the operation at the time of start of the vehicle having a turbo charger engine mounted thereon and equipped with a conventional lockup clutch control device.

When the fluid coupling with the lockup clutch is coupled to the turbo engine, however, it became clear that there arouses a problem concerning the timing for connecting the lockup clutch after the start of the vehicle. If, for example, a lockup instruction is produced when the engine revolution has approached the turbine revolution up to a speed ratio of about 0.8 after the occurrence of the stall of the first step like that of the natural aspiration engine, this moment is just the one when the boost increases accompanying an increase in the turbo charger output. Therefore, the output torque and the revolution of the engine increase again, connecting the lockup clutch becomes loses stability and, as a result, an extended period of time is required for the connecting or connecting the lockup clutch is accompanied by an increased shock. FIG. 9 is a graph illustrating a change in the engine revolution of when the fluid coupling is combined with a turbo engine which is highly supercharged by using a turbo charger of a large capacity and when the lockup instruction is produced at a moment when the speed ratio becomes 0.8. It will be learned that after the lockup instruction is produced, the engine revolution varies conspicuously, an extended period of time is required for connecting the lockup clutch, and the acceleration characteristics are deteriorated before and after the lockup clutch is fastened.

DISCLOSURE OF THE INVENTION

In view of the above-mentioned problems, it is an object of the present invention is to obtain a proper timing for connecting the lockup clutch after the start in a vehicle power transmission device in which a turbo engine and a fluid coupling with the lockup clutch are combined together. Namely, as described in claim 1, the present invention is concerned with:

"A vehicle power transmission device in which:

a fluid coupling is coupled to an engine equipped with a turbo charger;

the fluid coupling includes a pump coupled to the crankshaft of the engine, a turbine coupled to the output shaft of the fluid coupling, and a lockup clutch for connecting the pump with the turbine; and including a lockup clutch control device which, at the start of the vehicle, disconnects the lockup clutch to start the vehicle permitting the pump and the turbine to slide and, after the start, connects the lockup clutch while the vehicle is traveling at a low speed;

wherein the lockup clutch control device includes means for detecting the operating condition of the turbo charger, and starts connecting the lockup clutch at a moment before the turbo charger reaches its high output state".

The turbo engine equipped with the turbo charger involves a lag in the operation of the turbo charger. When combined with the fluid coupling, therefore, the above-mentioned two-step stall characteristics are exhibited losing stability in connecting the lockup clutch. In the present invention, however, the control device for connecting the lockup clutch is equipped with means for detecting the operating condition of the turbo charger, and is monitoring the operating condition. The control device starts connecting the lockup clutch at a moment before the turbo charger reaches its high output state. Therefore, connecting the lockup clutch is completed before the turbo charger output so increases as to increase the boost and before the revolution and the output torque of the engine are increased.

That is, the turbo charger reaches a steadily operating condition after the passage of a period of operation lag, the operating condition being determined by the engine operating conditions such as the amount of depressing the accelerator pedal. Usually, the driver, at the start, greatly depresses the accelerator pedal. After the passage of the period of operation lag, therefore, the turbo charger reaches a high output state close to the operating condition of when the engine is in full-load operation. Therefore, the engine produces a large output, and the output torque and the revolution increase. In the present invention, however, the lockup clutch is not connected at this moment. Therefore, no extended period of time is required for connecting the lockup clutch and, besides, the shock at the time of connecting is suppressed. When the boost is elevated due to a large turbo charger output and the engine produces a large output, connecting of the lockup clutch is completed and the engine is directly coupled to the transmission. Therefore, the vehicle accelerates smoothly accompanying an increase in the engine output.

According to an embodiment of the present invention as described in claim 2, the operating condition of the turbo charger is detected by means that detects the rate of change in the engine revolution, and the lockup clutch control device starts connecting the lockup clutch at a moment when the rate of change in the engine revolution becomes smaller than a predetermined value. As described in claim 3, further, the operating condition of the turbo charger is detected by means that detects the pressure in the intake pipe of the engine, and the lockup clutch control device starts connecting the lockup clutch at a moment when the pressure becomes greater than a predetermined value.

The revolution of the turbo engine reaches a limit during the period of operation lag of the turbo charger and, thereafter, increases necessarily. Upon detecting the rate of change in the revolution that becomes smaller than the predetermined value as described in claim 2, therefore, it is made possible to start connecting the lockup clutch at a moment before the turbo charger reaches the high output state. It is allowable, as a matter of course, to detect the operating condition of the turbo charger by detecting the boost in the intake pipe of the engine as described in claim 3. These means may be suitably selected by taking into consideration the conditions of the sensors provided for the engine control device.

As described in claim 4, the lockup clutch can be connected more reliably when the vehicle speed is detected by the lockup clutch control device and when connecting the lockup clutch is controlled depending upon the vehicle speed. Besides, the power transmission device that uses the fluid coupling is suited, by its own nature, for a diesel engine. As described in claim 4, therefore, the present invention can be effectively applied to a diesel engine.

BEST MODE FOR CARRYING OUT THE INVENTION

Figure 1:
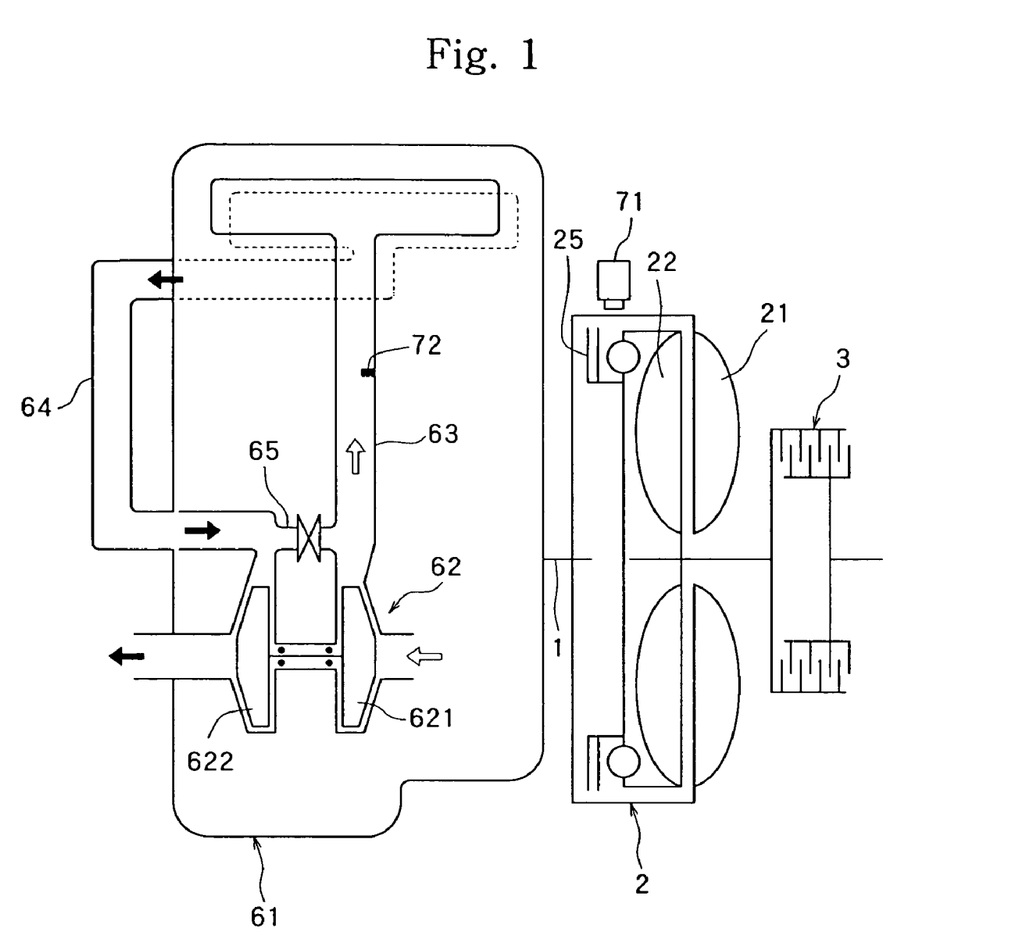
FIG. 1 is a view schematically illustrating a vehicle power transmission device with a fluid coupling to which a lockup clutch control device of the present invention is applied.

Described below with reference to the drawings is a vehicle power transmission device with a fluid coupling embodying the present invention. FIG. 1 schematically illustrates a vehicle power transmission device of the present invention including a diesel engine 61. The diesel engine 61 is equipped with a turbo charger 62 for charging. The turbo charger 62 includes a compressor 621 for compressing the air that is fed to the engine cylinders, and a compressor-driven turbine 622 coupled thereto. The air compressed by the compressor 621 has a pressure (boost) that is elevated, and is fed into the cylinders through the intake pipe 63. The exhaust gas after burned in the cylinder flows into the compressor-driven turbine 622 through the exhaust pipe 64 to drive it. The diesel engine is provided with an EGR passage 65 for recirculating the exhaust gas into the intake pipe 63 in order to decrease NOx in the exhaust gas.

The power of the diesel engine 61 is transmitted from the crankshaft 1 to the fluid coupling 2. The units constituting the vehicle power transmission device with the fluid coupling to which the invention is applied are not particularly different from those of the conventional device shown in FIG. 2 except that the diesel engine 61 is a turbo engine equipped with a turbo charger 62. That is, a transmission 4 having a parallel axis gear mechanism is coupled to the rear side of the fluid coupling 2 via a multi-plate wet clutch 3 which is a clutch for automatically making and breaking the connection. The pump 21 in the fluid coupling 2 is integrally coupled to the crankshaft 1 by using the casing 23 or the like, and the turbine 22 rotates integrally with the input shaft of the wet multi-plate clutch 3. Further, the turbine 22 rotates integrally with the input shaft of the wet multi-plate clutch 3. The wet multi-plate clutch 3 is in the fastened state except when the speed is to be changed, and the turbine 22 is directly coupled to the input shaft 41 of the transmission.

The fluid coupling 2 includes a lockup clutch 25 for connecting a pump 21 and a turbine 22 together. The constitution of the lockup clutch 25 and its control method are the same as those of the conventional device of FIG. 2, and a lockup clutch control device 70 is provided for connecting and disconnecting the lockup clutch 25. The flow of operation oil in the casing 23 fed with pressure from a trochoid pump 51 is changed over by a flow passage change-over valve 52 depending upon the instruction, so that the clutch disk 26 coupled to the turbine 22 is pushed onto the inner surface of the casing 23 and that the lockup clutch 25 is connected.

Figure 7:
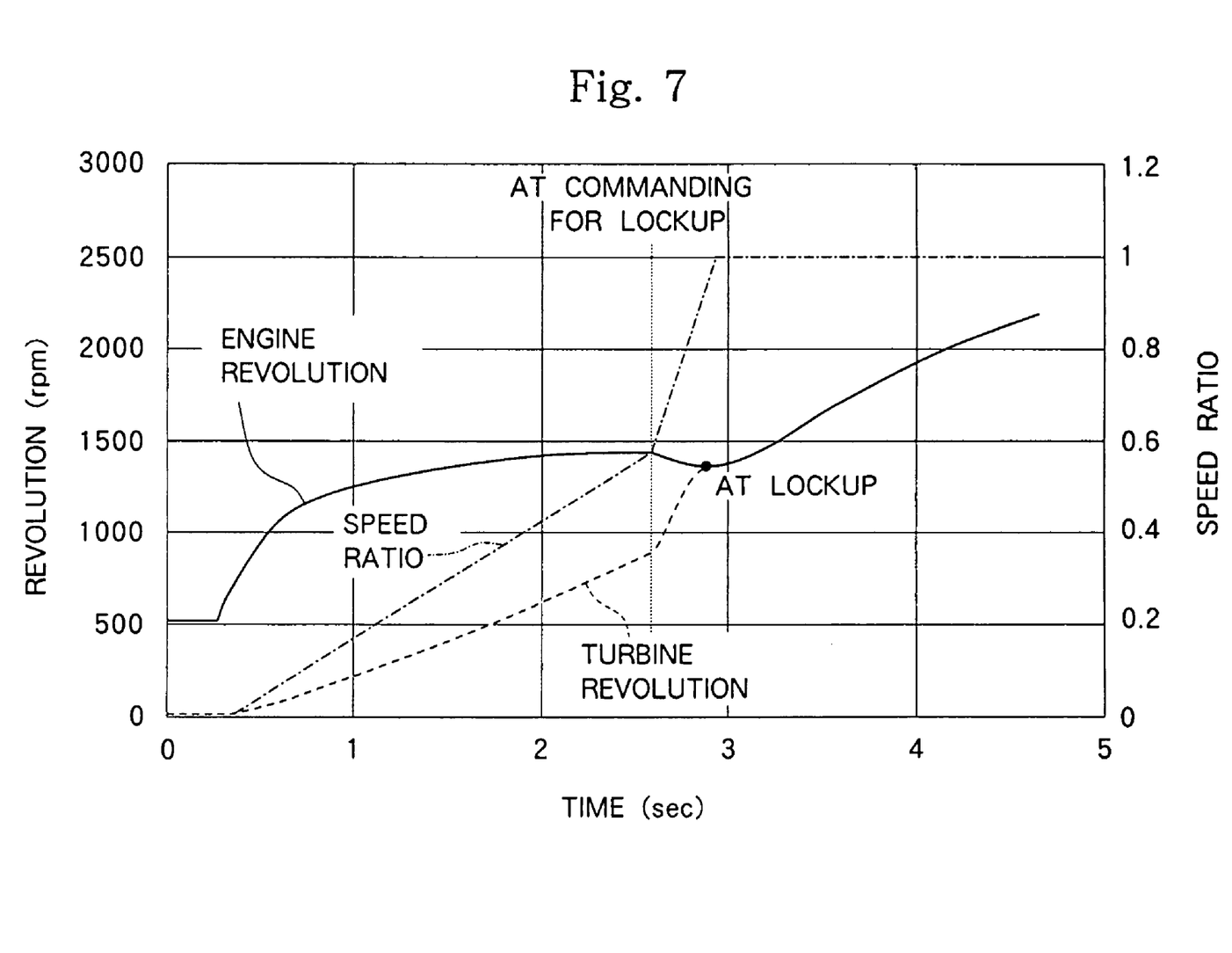
FIG. 7 is a diagram illustrating the operation of a vehicle equipped with the lockup clutch control device of the present invention at the time of start.

Next, described below are the operation of the turbo charger 62 and the method of controlling the lockup clutch 25 of the invention at the start of the vehicle. When the vehicle is at rest, the turbine 22 in the fluid coupling 2 linked to the wheels does not rotate. The lockup clutch 25 is disconnected, and the pump 21 rotates independently. When the diesel engine 61 is started, therefore, the pump 21 starts rotating at an idling speed of the engine and, at this moment, the speed ratio of the fluid coupling is zero (see FIG. 7). When the driver releases the brake in this state and depresses the accelerator pedal, the engine revolution rises quickly, the revolution of the turbine 22 gradually increases and the vehicle starts traveling. The speed ratio gradually increases, and the slipping of the fluid coupling 2 decreases correspondingly.

Figure 5:
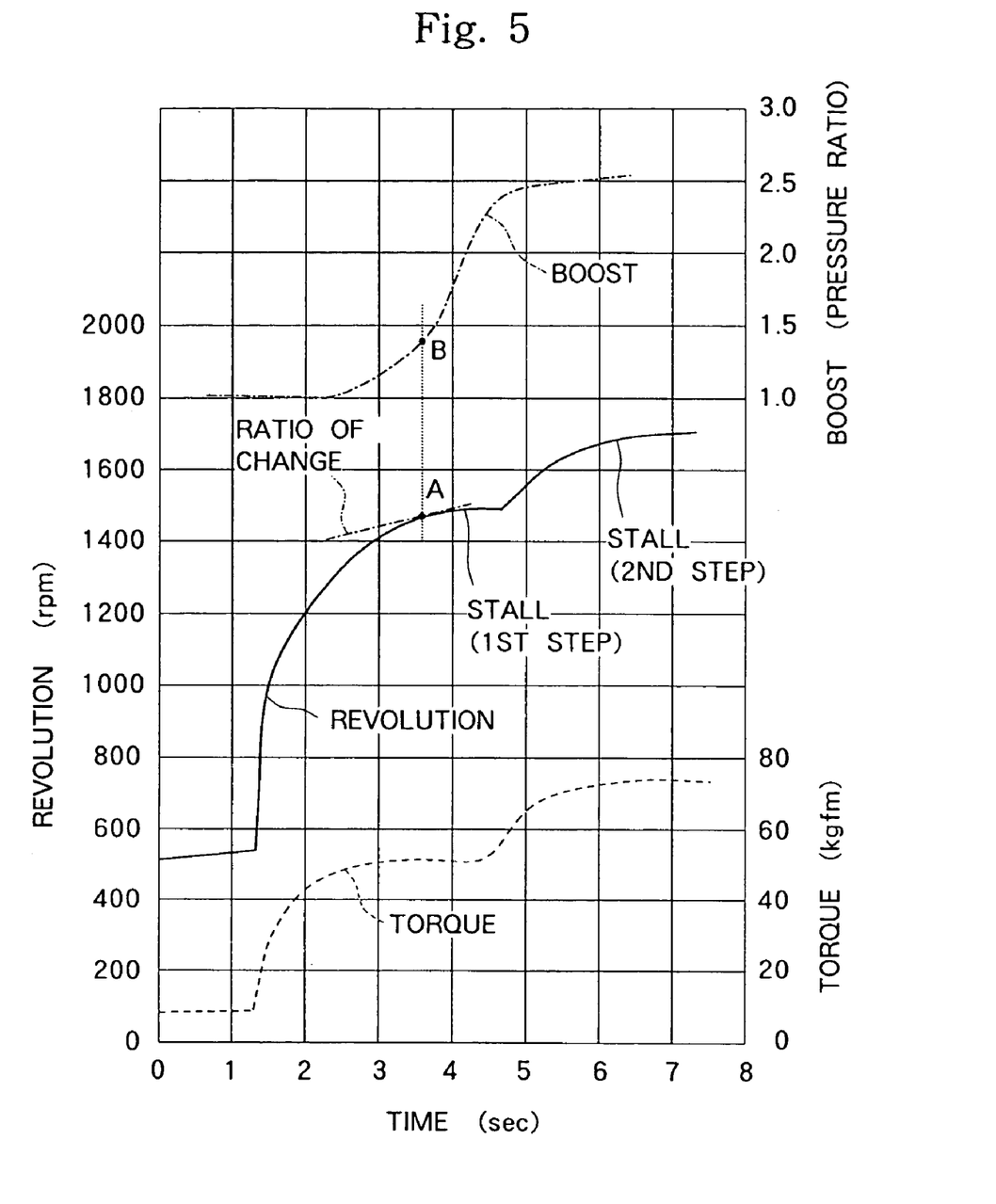
FIG. 5 is a diagram illustrating operation characteristics of an engine equipped with a turbo charger with the passage of time.

As described above, the turbo charger 62 mounted on the diesel engine 61 is accompanied by an operation lag due to inertia of the compressor 621 and of the compressor-driven turbine 622. Even after the start of the engine, therefore, the output of the turbo charge 62 is low for a certain period of time, and the revolution of the compressor 621 does not increase to a sufficient degree. As shown in FIG. 5, therefore, the pressure ratio which is a ratio of the outlet pressure and the inlet pressure of the compressor 621 does not almost increase, and the boost of the intake pipe 63 remains low. In this period, the output of the diesel engine 61 is suppressed and its revolution is suppressed to be a stall revolution of the first step. In this period, however, the revolution of the turbine 22 in the fluid coupling 2 gradually increases, the speed ratio increases, and the speed of the vehicle increases correspondingly.

The operating condition in which the revolution of the turbo charger 62 is so low that a sufficient degree of performance is not exhibited, lasts for only a predetermined short period of time and, thereafter, the boost is elevated accompanying an increase in the output of the turbo charger 62, and the output torque and the revolution of the diesel engine 61 increase. At the start, the driver greatly depresses the accelerator pedal. After the passage of the period of operation lag, therefore, the output of the turbo charger 62 reaches the high output state corresponding nearly to the full-load operation of the engine. In the present invention, the operating condition of the turbo charger 62 is detected, and an instruction signal is generated for connecting the lockup clutch at a moment before the turbo charger 62 reaches its high output state and before the output of the diesel engine 62 increases again.

In order to detect the operating condition of the turbo charger 62, here, a revolution sensor 71 (FIG. 1) is used to detect the revolution of the diesel engine 61 (to detect the revolution of the pump 21). The revolution of the diesel engine 61 once reaches a limit before the revolution of the turbo charger 62 increases and, thereafter, rises accompanying an increase in the output of the turbo charger 62. Inevitably, therefore, the revolution of the diesel engine 61 increases again. Therefore, the rate of change is calculated from the revolution detected by the revolution sensor 71, and the lockup clutch control device 70 produces an instruction signal for connection at a moment when the rate of change in the revolution of the diesel engine 61 has decreased to a predetermined value (point A in FIG. 5) after the start of the vehicle. Accordingly, the turbo charger 62 is placed in its high output state, and the lockup clutch 25 starts to be connected at a moment before the output of the diesel engine 61 increases again. When the turbo charger 62 is placed in the high output state and its revolution increases, the boost is elevated in the intake pipe 63. By utilizing this phenomenon, the boost or the pressure ratio is detected by a pressure sensor 72 installed in the intake pipe 63 instead of detecting a rate of change in the engine revolution, and an instruction signal may be output to connect the lockup clutch 25 at a moment when a predetermined pressure is reached (point B in FIG. 5).

When the connection instruction signal is output from the lockup clutch control device 70, the flow passage change-over valve 52 is changed over, the operation oil flows from the operation chamber between the pump and the turbine into the chamber 28 in front through the chamber 29 at the back of the clutch disk 26, and the friction fading 27 of the clutch disk 26 is pushed onto the inner surface of the casing 23. At this moment, the lockup clutch control device 70 adjusts the rate of changing over the flow passage change-over valve 52 by varying the duty ratio of the control pulse and properly controls the oil pressure for pushing the clutch disk 26 to prevent the shock of connection.

As described above, when the lockup clutch 25 starts to be connected when the ratio of change in the revolution of the diesel engine 61 has dropped to a predetermined value, i.e., at a suitable timing of when the stall revolution of the first step is reached, the connecting is accomplished in a state where the revolution of the pump 21 and the torque have been stabilized. As will be understood from the changes in the engine revolution of FIG. 7, therefore, the time required for the connection is shortened while avoiding the shock of connection due to variation in the revolution. Connecting the lockup clutch 25 is completed and the crankshaft 1 is directly coupled to the transmission 4 before the turbo charger 62 reaches the high output state and before the stall revolution of the second step is reached. At a moment when the connection is completed, the vehicle is in a state of traveling at a low speed after having been started. As the output torque and the revolution of the diesel engine 61 increase, the vehicle smoothly accelerates and the vehicle speed does not fluctuate as shown in FIG. 9.

Figure 6:
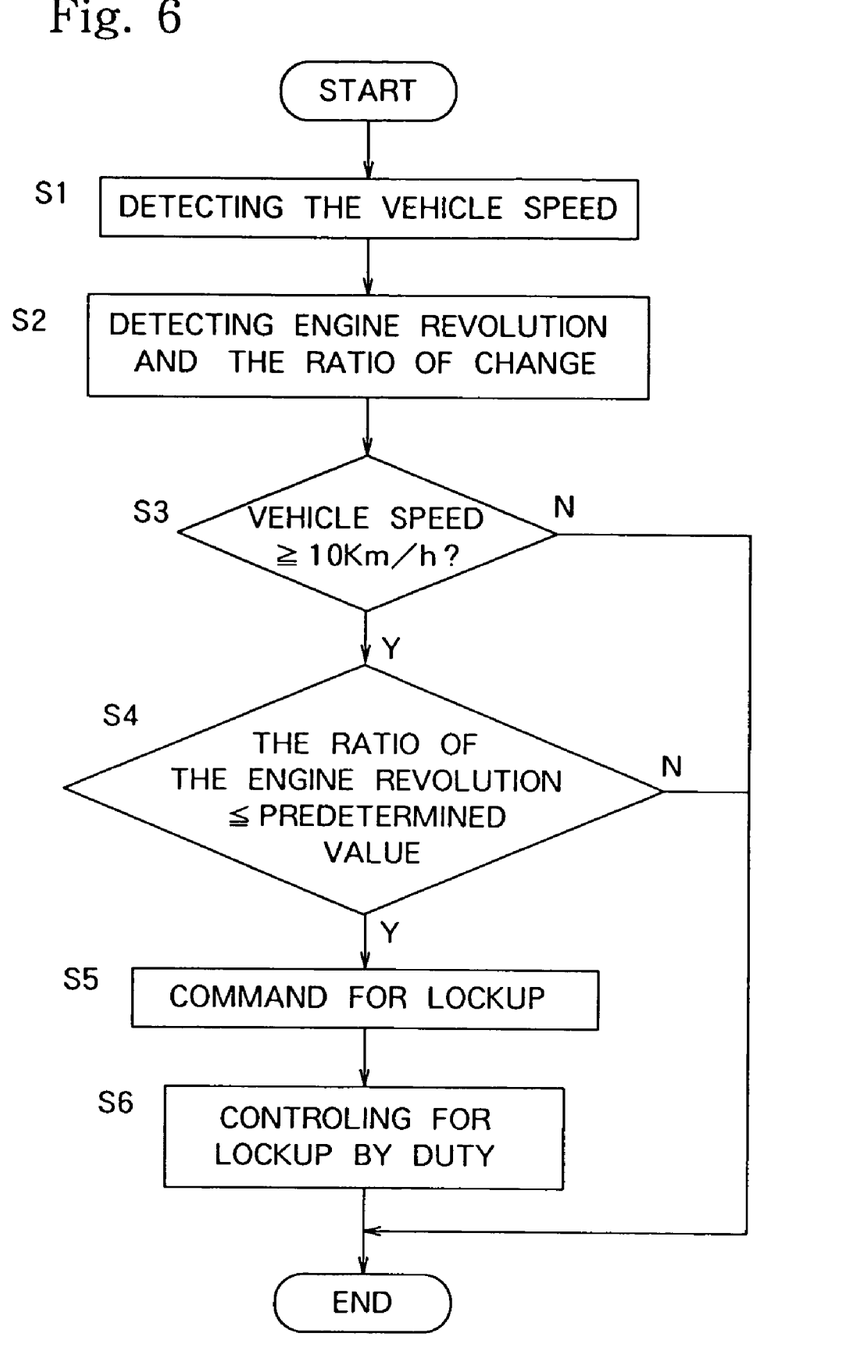
FIG. 6 is a flowchart illustrating the operation of a lockup clutch control device of the present invention.

FIG. 6 is a flowchart for controlling the connection of the lockup clutch according to the present invention. When the diesel engine 61 is started and the vehicle starts traveling, the vehicle speed is detected (S1) and it is judged if the vehicle speed is exceeding, for example, 10 Km/h (S3). This is because when the vehicle speed is too low, the revolution of the turbine 22 is very low, too, and is not suited for connecting the lockup clutch 25. When the gear of the transmission 4 has been determined, there exists a one-to-one relationship between the vehicle speed and the turbine (22). Therefore, the revolution of the turbine 22 may be detected instead of detecting the vehicle speed. When the vehicle speed is not reaching a predetermined value, the flow ends without producing the instruction for the lockup clutch. Here, when the rate of change in the engine revolution becomes smaller than a predetermined value as described below, the vehicle speed does not have to be judged for the power transmission device when the vehicle speed is exceeding a predetermined value at all times.

Namely, when the vehicle speed exceeds a predetermined value, it is judged if the rate of change in the revolution of the diesel engine 61 is smaller than a predetermined value (S4). For this purpose, the revolution sensor detects the revolution at all times to calculate the rate of change (S2). When the rate of change is not smaller than a predetermined value, it is not still the moment for connecting the lockup clutch, and the flow ends. When the predetermined value is reached, it is presumed that a proper timing is reached, and the lockup clutch control device 70 produces an instruction for connecting the lockup clutch 25 and starts controlling the duty ratio for connecting (S5, S6). It is allowable to use the boost as a condition for judgement instead of using the rate of change in the revolution as a condition of judgement, as a matter of course.

INDUSTRIAL APPLICABILITY

As described above in detail, the present invention is concerned with a vehicle power transmission device in which a turbo engine and a fluid coupling with the lockup clutch are combined together, and which is further equipped with means for detecting the operating condition of the turbo charger, wherein the timing for connecting the lockup clutch is normalized after the start while monitoring the operating condition. Therefore, the present invention can be utilized for the vehicle having the above power transmission device, and can be applied not only to diesel engines but also to gasoline engines that are turbo-charged. The invention can be, further, applied to even the power transmission devices which do not have a clutch such as a wet multi-plate clutch interposed at the back of the fluid coupling.

The invention claimed is:

1. A vehicle power transmission device in which:
   a fluid coupling is coupled to an engine equipped with a turbo charger;
   said fluid coupling includes a pump coupled to the crankshaft of said engine, a turbine coupled to the output shaft of said fluid coupling, and a lockup clutch for connecting said pump with said turbine; and
   including a lockup clutch control device which, at the start of the vehicle, disconnects said lockup clutch to start the vehicle permitting said pump and said turbine to slide and, after the start, connects said lockup clutch while the vehicle is traveling at a low speed;
   wherein said lockup clutch control device includes means for detecting the operating condition of said turbo charger, and starts connecting said lockup clutch at a moment before said turbo charger reaches its high output state.

2. The vehicle power transmission device according to claim 1, wherein means for detecting the operating condition of said turbo charger is means for detecting the rate of change in the revolution of said engine, and said power transmission control device starts connecting said lockup clutch at a moment when the rate of change becomes smaller than a predetermined value.

3. The vehicle power transmission device according to claim 1, wherein means for detecting the operating condition of said turbo charger is means for detecting the pressure in the intake pipe of said engine, and said power transmission control device starts connecting said lockup clutch at a moment when the pressure becomes greater than a predetermined value.

4. The control device for the vehicle power transmission device of claim 1, wherein said lockup clutch control device is equipped means for detecting the speed of the vehicle, and selects whether the lockup clutch be started to be connected depending upon the speed of the vehicle.

5. The control device for the vehicle power transmission device of claim 1, wherein said engine is a diesel engine.

* * * * *